United States Patent
Ueda (10) Patent No.: US 7,570,278 B2
(45) Date of Patent: Aug. 4, 2009

(54) OPTICAL SCANNING DEVICE AND IMAGE FORMING APPARATUS

(75) Inventor: Takeshi Ueda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 105 days.

(21) Appl. No.: 11/055,699

(22) Filed: Feb. 11, 2005

(65) Prior Publication Data

US 2005/0179771 A1    Aug. 18, 2005

(30) Foreign Application Priority Data

Feb. 12, 2004  (JP)  .............................. 2004-035645
Sep. 14, 2004  (JP)  .............................. 2004-267594

(51) Int. Cl.
*B41J 15/14*  (2006.01)
*B41J 27/00*  (2006.01)

(52) U.S. Cl. ...................................... 347/244; 347/258
(58) Field of Classification Search ................. 347/231, 347/241–244, 256–261, 230; 359/205–206, 359/223, 212, 641, 742, 565, 569
See application file for complete search history.

(56) References Cited

U.S. PATENT DOCUMENTS

| | | | |
|---|---|---|---|
| 5,410,563 A | | 4/1995 | Nakamura et al. |
| 5,589,982 A | * | 12/1996 | Faklis et al. ................. 359/565 |
| 5,638,212 A | * | 6/1997 | Meyers et al. ............... 359/569 |
| 6,067,106 A | * | 5/2000 | Ishibe et al. ................. 347/258 |
| 6,094,286 A | * | 7/2000 | Kato ........................... 359/206 |
| 6,147,815 A | * | 11/2000 | Fujie ........................... 359/742 |
| 6,400,486 B1 | | 6/2002 | Iizuka |
| 6,785,030 B2 | * | 8/2004 | Ishihara ....................... 359/212 |
| 6,813,051 B2 | * | 11/2004 | Suzuki et al. ................ 359/205 |
| 7,050,210 B2 | * | 5/2006 | Atsuumi et al. ............. 359/223 |
| 7,126,625 B2 | * | 10/2006 | Shimomura et al. ......... 347/244 |

(Continued)

FOREIGN PATENT DOCUMENTS

JP      04-328516      11/1992

(Continued)

OTHER PUBLICATIONS

U.S. Appl. No. 11/844,643, filed Aug. 24, 2007, Saisho, et al.

(Continued)

*Primary Examiner*—Hai C Pham
(74) *Attorney, Agent, or Firm*—Oblon, Spivak, McClelland, Maier & Neustadt, P.C.

(57) ABSTRACT

Light beams emitted from a light source, which is a semiconductor laser, are changed to weak diverging rays by a coupling lens, pass through an aperture, and are changed to parallel beams in a main scanning direction and light beams, which focus near a polygon mirror, in a sub-scanning direction by an anamorphic lens forming a first optical system. Further, the light beams are deflected by the polygon mirror and focused on an image surface through a dust-proof glass by a deflector side scanning lens and an image surface side scanning lens. The light source and the coupling lens are fixed to an identical member made of aluminum. Here, all lenses are made of resin, and diffractive surfaces are provided on a light source side surface of the coupling lens and an image surface side surface of the anamorphic lens.

32 Claims, 4 Drawing Sheets

U.S. PATENT DOCUMENTS 7,133,208 B2 * 11/2006 Kim .......................... 359/641
2005/0179771 A1    8/2005 Ueda

FOREIGN PATENT DOCUMENTS

| | | |
|---|---|---|
| JP | 06-118346 | 4/1994 |
| JP | 10-333070 | 12/1998 |
| JP | 11-84287 | 3/1999 |
| JP | 11-218699 | 8/1999 |
| JP | 2001-075035 | 3/2001 |
| JP | 2001-324691 | 11/2001 |
| JP | 2002-90672 | 3/2002 |
| JP | 3288970 | 3/2002 |
| JP | 2002-107645 | 4/2002 |
| JP | 2002-139687 | 5/2002 |
| JP | 2002-228962 | 8/2002 |
| JP | 2003-315712 | 11/2003 |
| JP | 2003-315717 | 11/2003 |
| JP | 2004126192 A * | 4/2004 |
| JP | 2004-212501 | 7/2004 |

OTHER PUBLICATIONS

U.S. Appl. No. 12/189,430, filed Aug. 11, 2008, Saisho.

* cited by examiner

| TEMPERATURE | FOCUS POSITION | |
|---|---|---|
| | MAIN SCANNING | SUB-SCANNING |
| 25°C | 0.0 mm | 0.0 mm |
| 45°C | −0.2 mm | 0.0 mm |

FIG.3

| TEMPERATURE | FOCUS POSITION | |
|---|---|---|
| | MAIN SCANNING | SUB-SCANNING |
| 25°C | 0.0 mm | 0.0 mm |
| 45°C | 0.0 mm | 0.6 mm |

| TEMPERATURE | FOCUS POSITION | |
| --- | --- | --- |
| | MAIN SCANNING | SUB-SCANNING |
| 25°C | 0.0 mm | 0.0 mm |
| 45°C | 11.6 mm | 3.3 mm |

OPTICAL SCANNING DEVICE AND IMAGE FORMING APPARATUS

CROSS-REFERENCE TO RELATED APPLICATIONS

The present document incorporates by reference the entire contents of Japanese priority document, 2004-035645 filed in Japan on Feb. 12, 2004 and 2004-267594 filed in Japan on Sep. 14, 2004.

BACKGROUND OF THE INVENTION

1) Field of the Invention

The present invention relates to an optical scanning device and an image forming apparatus, and in particular, to a lens that is used in an optical system for the optical scanning device.

2) Description of the Related Art

In recent years, in image forming apparatuses like a digital copying machine and a laser printer, density of image formation by optical scanning has been increasing. As a result, there is an increasing demand for producing a smaller light spot to form optical images on a photosensitive member. Characteristic of a lens have a great influence on the diameter of a light spot produced by the lens. In case of the glass lenses, shapes into which the glass lens can be machined are limited; moreover, it is very difficult to accurately hold the glass lens during machining. On the other hand, lenses that are made of resin have no such problems, and are cheaper than the glass lenses.

However, surface curvatures, thicknesses, and refractive indices of the resin lenses vary greatly with temperature. When the surface curvatures, thicknesses, and refractive indices vary, focus positions of the resin lens change, spot diameters increase, and this results into a degraded image. Moreover, wavelength of a semiconductor laser serving as a light source also changes with the surrounding temperature. Since the lens made of resin has large dispersion power compared with the glass lens, again, a focus position fluctuates and a spot diameter increases to cause deterioration in an image.

Figure 7A:
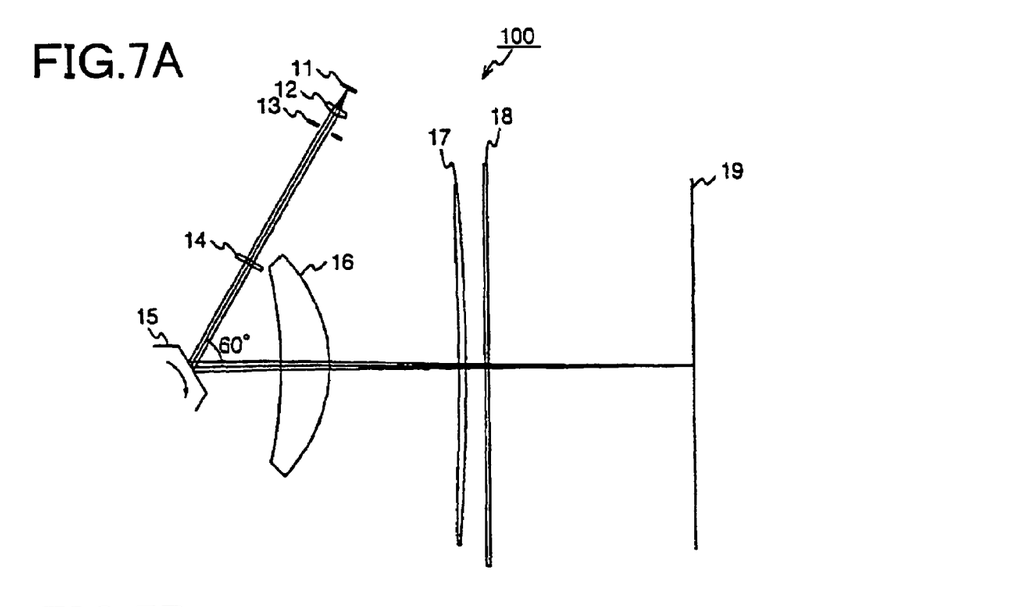
FIGS. 7A and 7B are diagrams of an example of a conventional scanning optical system in which all lenses are made of resin and do not use a diffractive optical surface.
Figure 7B:
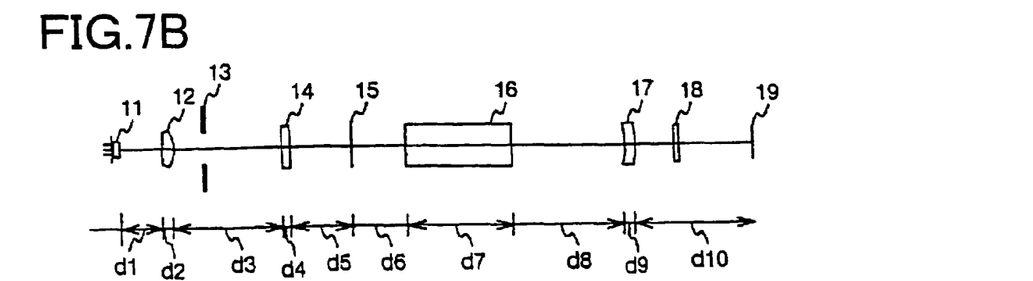

FIGS. 7A and 7B are diagrams of an example of a conventional scanning optical system 100. All the lenses used in the conventional scanning optical system 100 are made of resin; moreover, a diffractive optical surface is not used. FIG. 7A is a plan view of the optical system viewed from above and FIG. 7B is a schematic diagram in which the lenses are arranged on a straight line to represent distances among respective lens surfaces. This scanning optical system 100 includes a light source 11, such as by a semiconductor laser, a coupling lens 12, an aperture 13, an anamorphic lens 14, a polygon mirror 15, a deflector side scanning lens 16, an image surface side scanning lens 17, a dust-proof glass 18, and an image surface 19. Light beams emitted from the light source 11 are changed to weakly diverging rays by the coupling lens 12, pass through the aperture 13, and are changed into parallel beams in a main scanning direction and light beams, which focus near the polygon mirror 15, in a sub-scanning direction by the anamorphic lens 14 forming a first optical system. Further, the light beams are deflected by the polygon mirror 15 and focused on an image surface through the dust-proof glass 18 by the deflector side scanning lens 16 and the image surface side scanning lens 17. The light source 11 and the coupling lens 12 are fixed to an identical member made of aluminum.

Optical system data are indicated below. A light source wavelength is set to 780.1 nanometers at 25° C. and 786.5 nanometers at 45° C.

A light source side surface shape of the coupling lens 12 is a coaxial aspheric surface represented as follows:

$$x = (h^2/R)/[1+\sqrt{\{1-(1+K)(h/R)^2\}}] + A4 \cdot h^4 + A6 \cdot h^6 + A8 \cdot h^8 + A10 \cdot h^{10} \quad (1)$$

In the equation (1), h is a distance from an optical axis, R is a paraxial curvature radius, K is a cone constant, A4, A6, A8, and A10 are high-order coefficients, and x is a depth in an optical axis direction.

The coefficients are set as follows:
R=86.09118
K=361.987634
A4=−0.827025E−04
A6=−0.413360E−05
A8=0.942600E−06
A10=−0.936986E−07

An image surface side surface shape of the coupling lens 2 is an aspheric surface represented by the equation (1), and the coefficients are set as follows:
R=−8.71000
K=−0.310240
A4=0.592273E−04
A6=0.250465E−06
A8=0.119847E−06
A10=−0.563217E−08

Data for the anamorphic lens 14 are as follows:
A light source side surface shape of this anamorphic lens 14 is an anamorphic surface represented as follows:

$$x = \{(1/Rm) \cdot y^2 + (1/Rs) \cdot z^2\}/[1+\sqrt{\{1-(y/Rm)^2-(z/Rs)^2\}}] \quad (2)$$

In the equation (2), y is a main scanning direction distance from the optical axis, z is a sub-scanning direction distance from the optical axis, Rm is a main scanning direction curvature radius, Rs is a sub-scanning direction curvature radius, and x is a depth in the optical axis direction.

The coefficients are set as follows:
Rm=500
Rs=35.83

An image surface side surface shape of the anamorphic lens 14 is a plane.

A light source side surface shape of the deflector side scanning lens 16 is a coaxial aspheric surface represented by the equation (1).

The coefficients are set as follows:
R=−312.6
K=2.667
A4=1.79E−07
A6=−1.08E−12
A8=−3.18E−14
A10=3.74E−18

An image surface side surface shape of the deflector side scanning lens 16 is a coaxial aspheric surface represented by the equation (1).

The coefficients are set as follows:
R=−83.0
K=0.02
A4=2.50E−07
A6=9.61E−12
A8=4.54E−15
A10=−3.03E−18

Vertexes of both the surfaces deviate upward by 1.16 millimeters with respect to a main beam in FIG. 7.

A light source side surface shape of the image surface side scanning lens 17 is a non-arc represented by equation (3) in the main scanning direction. A sub-scanning curvature radius changes continuously as represented by equation (4) in the sub-scanning direction.

$$x=(y^2/Rm)/[1+\sqrt{\{1-(1+K)(y/Rm)^2\}}]+A4 \cdot y^4 + A6 \cdot y^6 + A8 \cdot y^8 + A10 \cdot y^{10} \quad (3)$$

In the equation (3), y is a main scanning direction distance from the optical axis, Rm is a main scanning paraxial curvature radius, K is a cone constant, A4, A6, A8, and A10 are high-order coefficients, and x is a depth in the optical axis direction.

$$Rs(y)=Rs+\Sigma bj \cdot y^j \text{ (where } j=1, 2, 3, \ldots) \quad (4)$$

In the equation (4), y a main scanning direction distance from the optical axis, Rs(y) is a sub-scanning radius in the main scanning direction distance y from the optical axis, Rs is a sub-scanning radius on the optical axis, and bj (where j=1, 2, 3, . . . ) are high-order coefficients.

The coefficients are set as follows:
Rm=−500
K=−71.73
A4=4.33E−08
A6=−5.97E−13
A8=−1.28E−16
A10=5.73E−21
Rs=−47.7
b2=1.60E−03
b4=−2.32E−07
b6=1.60E−11
b8=−5.61E−16
b10=2.18E−20
b12=−1.25E−24

An image surface side surface shape of the image surface side scanning lens 17 is a toroidal surface, and a sub-scanning shape is an arc represented by equation (5) and is a shape rotated around an axis parallel to the sub-scanning direction Rm apart in the optical axis direction from a vertex of this arc.

$$x=(z^2/Rs)/[1+\sqrt{\{1-(z/Rs)^2\}}] \quad (5)$$

In the equation (5), y is a main scanning direction distance from the optical axis, Rs is a sub-scanning paraxial curvature radius, and x is a depth in the optical axis direction.

The coefficients are set as follows:
Rm=−1000
Rs=−23.38

Vertexes of both the surfaces deviate upward by 1.21 millimeters with respect to the main beam in FIG. 7.

Surface intervals are set as follows (unit: millimeters).
d1=12.741
d2=3.8
d3=102.8
d4=3.0
d5=69.3
d6=51.7
d7=31.4
d8=78.0
d9=3.5
d10=143.62

In this optical system, a dust-proof glass 8 with a thickness of 1.9 millimeters (at 25° C.) is inserted to perform the above calculations. A refractive index of this glass is set to 1.511161 at a beam wavelength of 780.1 nanometers and a temperature of 25° C. and 1.511161 at a beam wavelength of 786.5 nanometers and a temperature of 45° C. and a linear expansion coefficient of the glass is set to $7.5E-06K^{-1}$.

All the lenses are made from the same resin material. Moreover, refractive indices of the lenses are 1.523946 at a beam wavelength of 780.1 nanometers and a temperature of 25° C., and 1.522105 at a beam wavelength of 786.5 nanometers and a temperature of 45° C., and a linear expansion coefficient of the lenses is $7.0E-05K^{-1}$.

Figure 8:
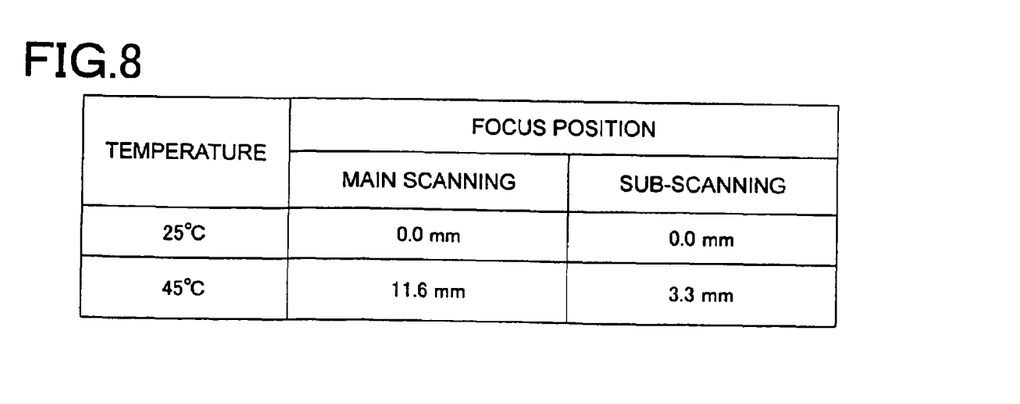
FIG. 8 is a diagram of a result of calculating a focus position with respect to an image surface position with the conventional scanning optical system.

When a focus position with respect to an image surface position is calculated taking into account changes in a beam wavelength, a refractive index, a surface shape, and a thickness according to a temperature under the conditions described above, a result shown in FIG. 8 is obtained. It is seen from this result that, when the environmental temperature changes from 25° C. to 45° C., the focus position deviates in the main scanning direction from 0.0 millimeters to 11.6 millimeters and in the sub-scanning direction from 0.0 millimeters to 3.3 millimeters.

As means for solving this problem, for example, Japanese Patent Application Laid-Open No. 2002-214556 discloses a method of correcting the change in a focus position by combining at least three lenses in an optical system before a deflector (polygon mirror). In addition, Japanese Patent Application Laid-Open No. H10-333070 discloses a method of correcting the change in a focus position by providing a diffractive optical surface in a scanning lens.

However, in the conventional technology disclosed in Japanese Patent Application Laid-Open No. 2002-214556, cost increases due to an increase in the number of lenses and, even in this case, at least one glass lens is required, which further increases cost.

The conventional technology disclosed in Japanese Patent Application Laid-Open No. H10-333070 has a problem in that, since a scanning lens used in the conventional technology has a wide area through which light beams pass, it takes time to machine a diffractive surface, which leads to an increase in cost.

SUMMARY OF THE INVENTION

It is an object of the present invention to solve at least the problems in the conventional technology.

An optical scanning device according to an aspect of the present invention includes a light source consisting of a semiconductor laser; a coupling optical system that couples light beams from the light source, wherein the coupling optical system includes a plurality of lenses; a first optical system that changes the light beams from the coupling optical system to parallel beams in a main scanning direction and light beams, which are focused on a deflector, in a sub-scanning direction; a deflector that that deflects the light beams from the first optical system to the main scanning direction; and a scanning optical system that condenses the light beams deflected by the deflector. All the lenses in the coupling optical system are made of resin, and each of the lenses in the coupling optical system has a diffractive optical surface at least on one surface thereof.

An optical scanning device according to another aspect of the present invention includes a light source consisting of a semiconductor laser; a coupling optical system that couples light beams from the light source; a first optical system that changes the light beams from the coupling optical system to parallel beams in a main scanning direction and light beams, which are focused on a deflector, in a sub-scanning direction, wherein the first optical system includes a plurality of lenses; a deflector that that deflects the light beams from the first optical system to the main scanning direction; and a scanning optical system that condenses the light beams deflected by the deflector. All the lenses in the first optical system are made of resin, and each of the lenses in the first optical system has a diffractive optical surface on at least one surface thereof.

An optical scanning device according to still another aspect of the present invention includes a light source consisting of a semiconductor laser; a coupling optical system that couples light beams from the light source, wherein the coupling optical system includes a plurality of first lenses; a first optical system that changes the light beams from the coupling optical system to parallel beams in a main scanning direction and light beams, which are focused on a deflector, in a sub-scanning direction, wherein the first optical system includes a plurality of second lenses; a deflector that that deflects the light beams from the first optical system to the main scanning direction; and a scanning optical system that condenses the light beams deflected by the deflector. All the first lenses and the second lenses are made of resin, and each of the first lenses and the second lenses has a diffractive optical surface on at least one surface thereof.

An optical scanning device according to still another aspect of the present invention includes a light source consisting of a semiconductor laser; a coupling optical system that couples light beams from the light source; a first optical system that changes the light beams from the coupling optical system to parallel beams in a main scanning direction and light beams, which are focused on a deflector, in a sub-scanning direction; a deflector that that deflects the light beams from the first optical system to the main scanning direction; and a scanning optical system that condenses the light beams deflected by the deflector. A diffractive optical surface is provided at least on one surface of each of lenses constituting the coupling optical system and the first optical system, and the diffractive optical surface is constituted as a concentric or linear lattice by forming unevenness on the surface of the lenses.

An optical scanning device according to still another aspect of the present invention includes a light source consisting of a semiconductor laser; a coupling optical system that couples light beams from the light source; a first optical system that changes the light beams from the coupling optical system to parallel beams in a main scanning direction and light beams, which are focused on a deflector, in a sub-scanning direction; a deflector that that deflects the light beams from the first optical system to the main scanning direction; and a scanning optical system that condenses the light beams deflected by the deflector. At least one of lenses constituting the scanning optical system is made of resin, and a diffractive optical surface, which is a linear lattice, and a diffractive optical surface, which is a circular lattice, are provided in the coupling optical system or the first optical system.

An image forming apparatus according to still other aspects of the present invention employs the above optical scanning device according to the present invention.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be hereinafter explained in detail with reference to the accompanying drawings. However, components, types, combinations, shapes, and relative arrangements of the components, and the like are not meant to limit a scope of the invention only to them but are simple examples of explanation unless specifically described otherwise.

Figure 1A:
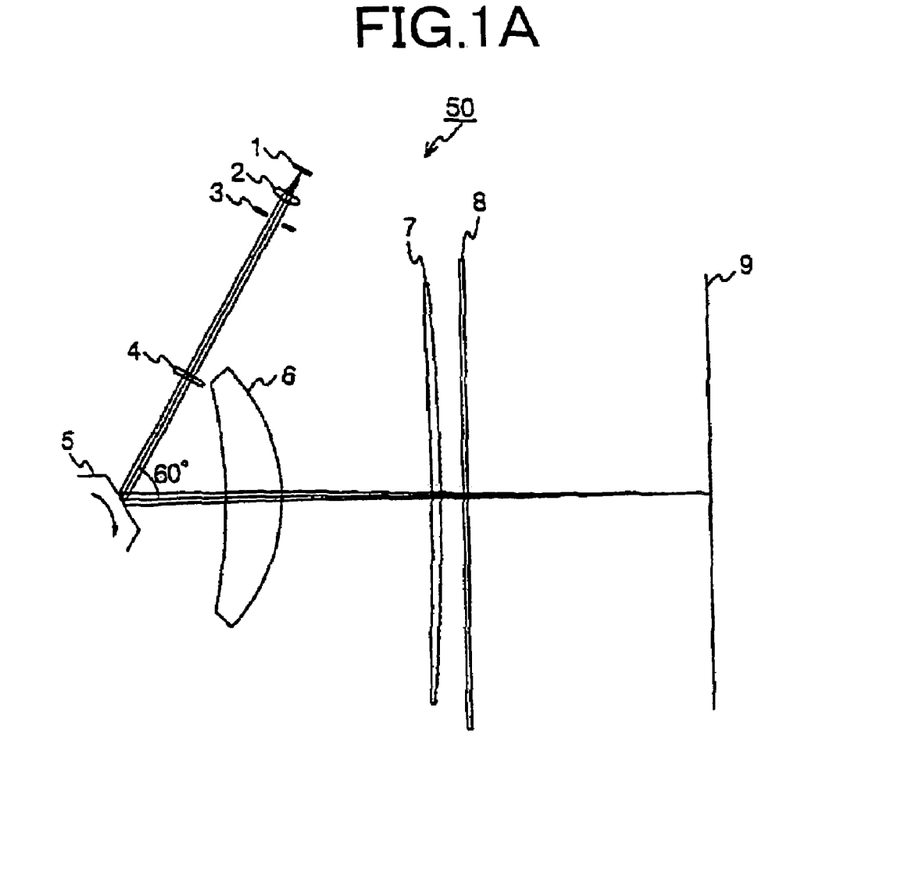
FIGS. 1A and 1B are diagrams of an example of a scanning optical system using a diffractive optical surface according to a first embodiment of the invention.
Figure 1B:
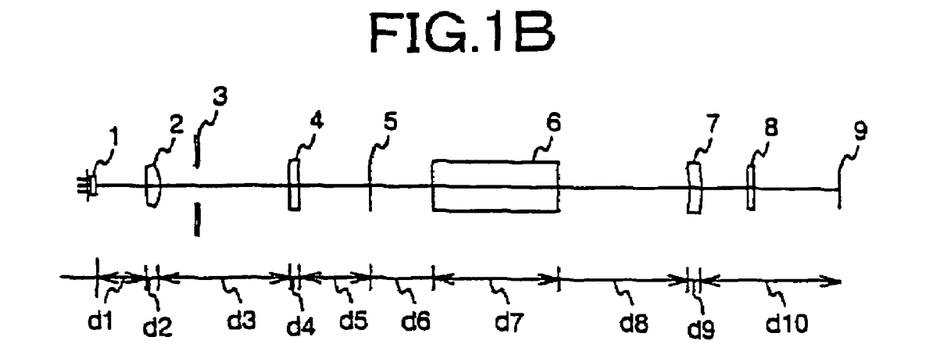
Figure 5A:
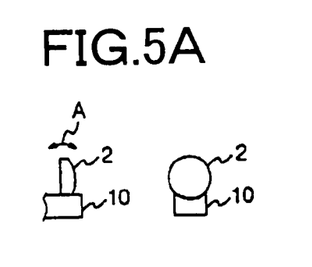
FIGS. 5A and 5B are diagrams at the time when a coupling lens 2 of the invention is bonded to a holding member 10.
Figure 5B:
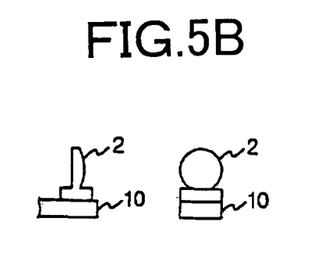

FIGS. 1A and 1B are diagrams of an example of a scanning optical system using a diffractive optical surface according to a first embodiment of the invention. FIG. 1A is a plan view of the optical system viewed from a position above the optical system. FIG. 1B is a schematic diagram in which lenses are arranged on a straight line to represent distances among respective lens surfaces. This scanning optical system 50 includes a light source 1 constituted by a semiconductor laser, a coupling lens 2, an aperture 3, an anamorphic lens 4, a polygon mirror 5, a deflector side scanning lens 6, an image surface side scanning lens 7, a dust-proof glass 8, and an image surface 9. Light beams emitted from the light source 1, which is the semiconductor laser, are changed to weak diverging rays by the coupling lens 2, pass through the aperture 3, and are changed to parallel beams in a main scanning direction and light beams, which focus near the polygon mirror 5, in a sub-scanning direction by the anamorphic lens 4 forming a first optical system. Further, the light beams are deflected by the polygon mirror 5 and focused on an image surface 9 through the dust-proof glass 8 by the deflector side scanning lens 6 and the image surface side scanning lens 7. The light source 1 and the coupling lens 2 are fixed to an identical member made of aluminum. Here, all the lenses are made of resin, and diffractive surfaces are provided on a light source side surface of the coupling lens 2 and an image surface side surface of the anamorphic lens 4. When the coupling lens 2 is formed in a shape as shown in FIG. 5A and bonded to a holding member 10, toppling as indicated by arrow A in the figure tends to occur, which causes an increase in a spot diameter. Thus, if the coupling lens 2 is machined into a shape that is less likely to cause toppling as shown in FIG. 5B, it is possible to control the increase in a spot diameter. Although it is difficult to machine a glass lens into such a shape, it is possible to easily machine a resin lens into the shape. This holds true for the anamorphic lens 4. Since the deflector side scanning lens 6 and the image surface side scanning lens 7 are also made of resin, it is easy to machine the surfaces of the deflector side scanning lens 6 and the image surface side scanning lens 7 into special surfaces that are advantageous for a reduction in a spot diameter.

However, a resin lens is susceptible to temperature change and, when a temperature changes, deviation in a focus position occurs in the resin lens, which causes an increase in a spot diameter. On the other hand, a diffractive has a direction of change in an angle of refraction due to a change in a wavelength opposite to that of a usual refractive surface. Thus, it is possible to compensate for the deviation in a focus position due to temperature change and cope with the reduction in a diameter of a light spot using this characteristic.

In the optical system before the deflector that includes the coupling lens 2 forming a coupling optical system, the aperture 3, and the anamorphic lens 4 forming a first optical system, light beams emitted from the light source are diverging light beams in both the main scanning direction and the sub-scanning direction and changed to substantially parallel beams in the main scanning direction and focused in the sub-scanning direction near the deflector. The entire optical system before the deflector has positive power. The diffractive optical surface has a direction of change in an angle of refraction due to a change in a wavelength opposite to that of a usual refractive surface. To cancel the deviation in a focus position due to temperature change on the diffractive optical surface using this characteristics, it is desirable that the diffractive optical surface with largest power has the positive power that is the same as the power of the entire optical system. The diffractive optical surface with largest power in this embodiment is the diffractive optical surface of the coupling lens 2, which has positive power.

Moreover, the scanning optical system also includes resin lenses. When deviation in a focus position due to temperature change caused by these lenses is cancelled on the diffractive optical surface, it is desirable that composite power of the resin lenses in the scanning optical system is positive power, which is the same as power of the diffractive optical surface with largest power, both in the main scanning direction and the sub-scanning direction for the same reason as described above. In this embodiment, composite power of the two resin lenses of the scanning optical system is also positive power both in the main scanning direction and the sub-scanning direction.

Unevenness is provided on the two diffractive optical surfaces to obtain a diffractive effect. This makes it possible to produce a large quantity of lenses at high speed with injection molding by carving a reversal of the unevenness of the diffractive optical surfaces in a mold, which leads to a reduction in cost. The diffractive optical surface of the coupling lens 2 is a concentric lattice and the diffractive optical surface of the anamorphic lens 4 is a linear lattice. It is possible to machine the concentric lattice by rotating a mold or a lens itself and machine the linear lattice by linearly moving a mold or a lens itself back and forth. Since it is easy to machine these lattices compared with a concentrically elliptical lattice and other special lattices, it is possible to reduce cost.

Figure 4:
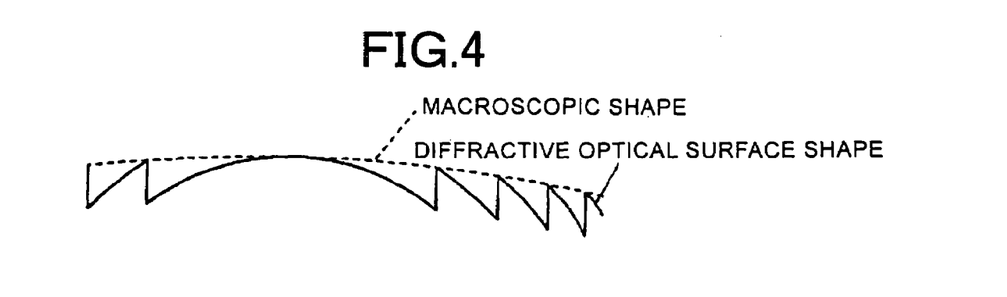
FIG. 4 is a diagram explaining a macroscopic shape of a diffractive optical surface of an anamorphic lens 4 of the invention.

As shown in FIG. 4, the diffractive optical surface of the anamorphic lens 4 is formed as a plane microscopically. By forming the diffractive optical surface as a plane microscopically, accuracy of a depth of a lattice is easily attained. This makes it possible to perform highly accurate machining and improve performance easily.

The light beams are changed to substantially parallel beams in the main scanning direction and focused in the sub-scanning direction near the deflector. Power of the optical system before the deflector is different in the main scanning direction and the sub-scanning direction. Therefore, to cancel the fluctuation due to temperature change on the diffractive optical surface both in the main scanning and the sub-scanning, it is desirable that power of the diffractive optical surface is different in the main scanning and the sub-scanning. In this embodiment, the diffractive optical surface of the coupling lens 2 has the same power both in the main scanning and the sub-scanning and the diffractive optical surface of the anamorphic lens 4 has power only in the sub-scanning. Therefore, the power of the diffractive optical surface is different in the main scanning and the sub-scanning.

Since outgoing beams from the coupling lens 2 are diverging rays, it is possible to set an area of the diffractive optical surface of the coupling lens 2 small compared with an aperture radius. This makes it possible to reduce machining time and reduce cost.

In the optical system before the deflector that includes the coupling lens 2 forming the coupling optical system, the aperture 3, and the anamorphic lens 4 forming the first optical system, light beams from the light source are changed to weak diverging rays by the coupling lens 2, limited by the aperture 3, and changed to substantially parallel beams in the main scanning direction and focused in the sub-scanning direction near the deflector by the anamorphic lens 4 forming the first optical system. In this way, the optical system before the deflector has different powers in the main scanning direction and the sub-scanning direction. Thus, although the diffractive optical surface corrects deviation in a focus position, the diffractive optical surface of the circular lattice cannot correct deviation in a focus position in both the main scanning and the sub-scanning directions. Therefore, the diffractive optical surface of the linear lattice is also required.

The diffractive optical surfaces of the circular lattice and the linear lattice may be provided on a light source side surface and an image side surface of an identical lens. However, it is desirable to adopt a structure described below because wavefront deterioration is prevented. Here, the light source side surface of the coupling lens 2 is provided with the diffractive optical surface of the circular lattice with a concave spherical surface as a base, and the image surface side of the coupling lens 2 is formed as a rotationally symmetrical surface. Shapes of all the surfaces constituting the coupling lens 2 are made rotationally symmetrical to be identical in this way to prevent respective rotationally symmetrical axes from deviating from each other to deteriorate a wavefront.

The light source side surface of the anamorphic lens 4 is formed as an anamorphic surface that is plane symmetrical in the main scanning direction and the sub-scanning direction. The image side surface of the anamorphic lens 4 is provided with the diffractive optical surface of the linear lattice that is plane symmetrical in the main scanning direction and the sub-scanning direction with a plane as a base. Shapes of all the surfaces constituting the anamorphic lens 4 are made plane symmetrical to be identical in this way to prevent respective symmetrical surface angles from deviating from each other to deteriorate a wavefront.

Unevenness is provided on the two diffractive optical surfaces to obtain a diffractive effect. If the lenses are made of resin, it is possible to produce a large quantity of lenses at high speed with injection molding by carving a reversal of the unevenness of the diffractive optical surfaces in a mold, which desirably leads to a reduction in cost. The diffractive optical surface of the coupling lens 2 is a concentric lattice and the diffractive optical surface of the anamorphic lens 4 is a linear lattice. It is possible to machine the concentric lattice by rotating a mold or a lens itself and machine the linear lattice by linearly moving a mold or a lens itself back and forth. It is easy to machine these lattices compared with a concentrically elliptical lattice and other special lattices, which desirably leads to reduce cost.

Optical system data according to the first embodiment are indicated below. A light source wavelength is set to 780.1 nanometers at 25° C. and 786.5 nanometers at 45° C.

The light source side surface shape of the coupling lens 2 is a coaxial spherical surface with a curvature radius of −50.49 millimeters as a macroscopic surface shape. A diffractive optical surface is added to this coaxial spherical surface (see FIG. 4).

A phase function φ(h) of the diffractive optical surface is represented by equation (6).

$$\phi(h) = C1 \cdot h^2 + C2 \cdot h^4 + C3 \cdot h^6 + C4 \cdot h^8 + C5 \cdot h^{10} \quad (6)$$

Here, when a distance from the optical axis is defined as h and phase coefficients are defined as C1, C2, C3, C4, and C5, the coefficients are set as follows:
C1=−1.6689E−02
C2=−1.2977E−06
C3=−4.9748E−07
C5=−4.8953E−09

An image surface side surface shape of the coupling lens 2 is an aspheric surface represented by the equation (1), and the coefficients are set as follows:
R=−10.98449
K=−0.310240
A4=0.592273E−04
A6=0.250465E−06
A8=0.119847E−06
A10=−0.563217E−08

A light source side surface shape of the anamorphic lens 4 is an anamorphic surface represented by the equation (2), and the coefficients are set as follows:
Rm=460.967
Rs=35.8.

An image side surface shape of the anamorphic lens 4 is a plane as a macroscopic shape and a diffractive optical surface is added to the plane. A phase function φ(z) of the diffractive optical surface is represented by equation (7).

$$\phi(z) = C1 \cdot z^2 \quad (7)$$

Here, when a sub-scanning direction distance from the optical axis is defined as z and a phase coefficient is defined as C1, the coefficient is set as follows:
C1=−3.9642E−05

A light source side surface shape of the deflector side scanning lens 6 is a coaxial aspheric surface represented by the equation (1), and the coefficients are set as follows:
R=−312.6
K=2.667
A4=1.79E−07
A6=−1.08E−12
A8=−3.18E−14
A10=3.74E−18

An image surface side surface shape of the deflector side scanning lens 6 is a coaxial aspheric surface represented by equation (1), and the coefficients are set as follows:
R=−83.0
K=0.02
A4=2.50E−07
A6=9.61E−12
A8=4.54E−15
A10=−3.03E−18

Vertexes of both the surfaces deviate upward by 1.16 millimeters with respect to the main beam in FIG. 1.

A light source side surface shape of the image surface side scanning lens 7 is a non-arc represented by the equation (3) in the main scanning direction. A sub-scanning curvature radius changes continuously as represented by the equation (4) in the sub-scanning direction, and the coefficients are set as follows:
Rm=−500
K=−71.73
A4=4.33E−08
A6=−5.97E−13
A8=−1.28E−16
A10=5.73E−21
Rs=−47.7
b2=1.60E−03
b4=−2.32E−07
b6=1.60E−11
b8=−5.61E−16
b10=2.18E−20
b12=−1.25E−24.

An image surface side surface shape of the image surface side scanning lens 7 is a toroidal surface, and a sub-scanning shape is an arc represented by the equation (5) and is a shape rotated around an axis parallel to the sub-scanning direction Rm apart in the optical axis direction from a vertex of this arc. The coefficients are set as follows:
Rm=−1000
Rs=−23.38

Vertexes of both the surfaces deviate upward on the figure by 1.21 millimeters with respect to the main beam in FIG. 1. The surface intervals among the respective lenses are set as follows:
d1=12.792
d2=3.8
d3=102.8
d4=3.0
d5=69.3
d6=51.7
d7=31.4
d8=78.0
d9=3.5
d10=143.62.

Note that, in this optical system, a dust-proof glass 8 with a thickness of 1.9 millimeters (at 25° C.) is inserted to perform the above calculations. A refractive index of this glass is set to 1.511161 at a beam wavelength of 780.1 nanometers and a temperature of 25° C. and 1.511161 at a beam wavelength of 786.5 nanometers and a temperature of 45° C. and a linear expansion coefficient of the glass is set to 7.5E−06K−1. All the lenses consist of an identical resin material, a refractive index of the lenses is set to 1.523946 at a beam wavelength of 780.1 nanometers and a temperature of 25° C. and 1.522105 at a beam wavelength of 786.5 nanometers and a temperature of 45° C., and a linear expansion coefficient of the lenses is set to 7.0E−05K$^{-1}$.

Figure 2:
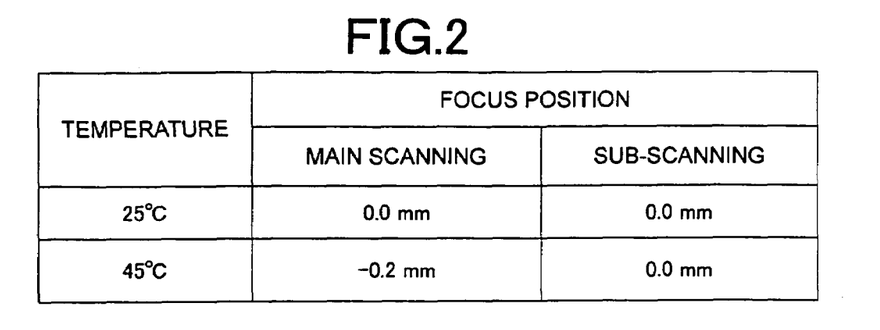
FIG. 2 is a diagram of a result of calculating a focus position with respect to an image surface position according to the first embodiment.

When a focus position with respect to an image surface position is calculated taking into account changes in a beam wavelength, a refractive index, a surface shape, and a thickness according to a temperature under the conditions described above, a result shown in FIG. 2 is obtained. It is seen from this result that, when the environmental temperature changes from 25° C. to 45° C., the focus position changes in the main scanning direction only from 0.0 millimeters to −0.2 millimeters. This indicates a significant reduction in the change of the focus position.

Next, an example of a scanning optical system using a diffractive optical surface according to a second embodiment of the invention will be explained. Since a structure of the scanning optical system is the same as that shown in FIG. 1, an explanation of the structure will be omitted.

The second embodiment is different from the first embodiment in that a macroscopic shape of a diffractive optical surface provided on the light source side surface of the coupling lens 2 is a plane. This makes it possible to attain accuracy of a depth of a lattice easily and improve performance more easily.

Optical system data are indicated below. A light source wavelength is set to 780.1 nanometers at 25° C. and 786.5 nanometers at 45° C.

A light source side surface shape of the coupling lens 2 is plane as a macroscopic surface shape. A diffractive optical surface is added to the plane. A phase function $\phi(h)$ of the diffractive optical surface is represented by the equation (6), and the coefficients are set as follows:

C1=−2.1065E−02
C2=1.0555E−05
C3=−5.8261E−07
C4=−3.1862E−08
C5=−2.1403E−09.

An image surface side surface shape of the coupling lens 2 is an aspheric surface represented by the equation (1), and the coefficients are set as follows:

R=−18.74123
K=−0.310240
A4=0.592273E−04
A6=0.250465E−06
A8=0.119847E−06
A10=−0.563217E−08

A light source side surface shape of the anamorphic lens 4 is an anamorphic surface represented by the equation (2), and the coefficients are set as follows:

Rm=167.48
Rs=1000.00.

An image surface side surface shape of the anamorphic lens 4 is a plane as a macroscopic surface shape, and a diffractive optical surface is added to the plane. A phase function $\phi(z)$ of the diffractive optical surface is represented by the equation (7), and the coefficients are set as follows:

C1=−8.2708E−03

The surface intervals are set as follows:

d1=12.843
d2=4.88
d3=102.8
d4=3.0
d5=69.3
d6=51.7.

Optical system data, surface intervals, and materials behind the deflector are identical with those in the first embodiment.

Figure 3:
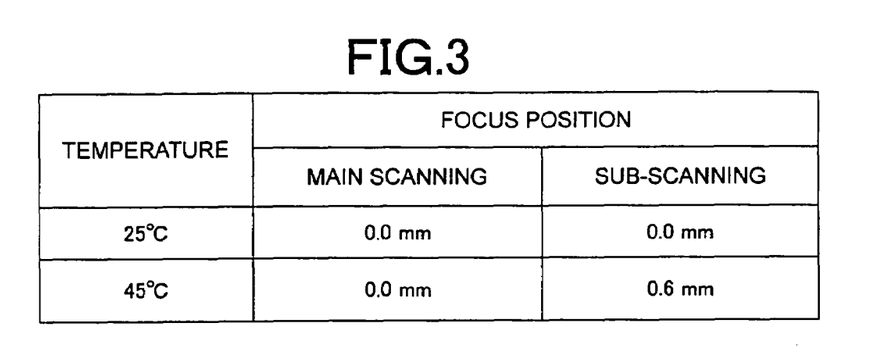
FIG. 3 is a diagram of a result of calculating a focus position with respect to an image surface position according to a second embodiment of the invention.

When a focus position with respect to an image surface position is calculated taking into account changes in a beam wavelength, a refractive index, a surface shape, and a thickness according to a temperature under the conditions described above, a result shown in FIG. 3 is obtained. It is seen from this result that, when the environmental temperature changes from 25° C. to 45° C., the focus position changes in the sub-scanning direction from 0.0 millimeters to 0.6 millimeters. This indicates a reduction in the change of the focus position.

The optical scanning devices according to the embodiments described above adopt a single beam system. However, it is also possible to adopt a system for synthesizing light beams from plural semiconductor lasers serving as light sources with a prism or the like or it is also possible to perform optical scanning in a multi-beam system.

Figure 6:
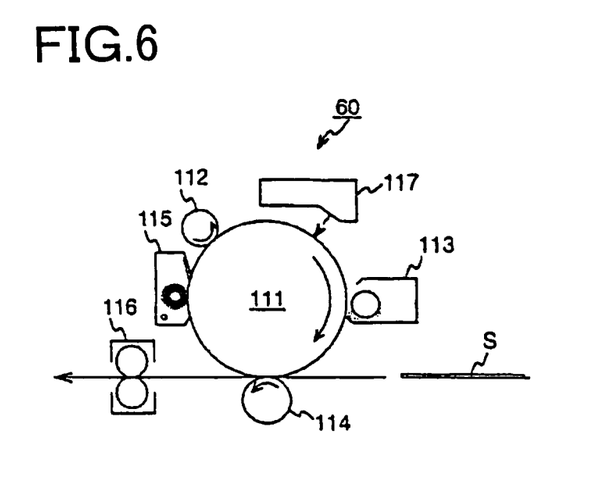
FIG. 6 is a diagram of a form of an image forming apparatus of the invention.

FIG. 6 is a an image forming apparatus 60 according to the present invention. This image forming apparatus 60 is an optical printer. The image forming apparatus 60 has a photoconductive photosensitive member 111, which is formed in a cylindrical shape, as a photosensitive medium and has a charging unit 112 (although a contact type charging unit using a charging roller is shown in the figure, it is also possible to use a corona charger or a charging brush), a developing device 13, a transfer unit 114 (although a transfer roller is shown in the figure, a transfer unit using a corona charger may be used), and a cleaning device 115 around the photosensitive member 111. Reference numeral 116 denotes a fixing device. The image forming apparatus 60 also has an optical scanning device 117 to perform image writing by optical scanning between the charging unit 112 and the developing device 113. It is possible to use the optical scanning devices according to the embodiments of the invention as the optical scanning device 117.

To perform image formation using the image forming apparatus of this form, the photosensitive member 111 is rotated at a uniform velocity in a direction of arrow and a surface of the photosensitive member 111 is uniformly charged by the charging unit 112. Subsequently, an image is written according to optical scanning by the optical scanning device and an electrostatic latent image corresponding to the written image is formed. The formed electrostatic latent image is a so-called "negative latent image", in which an image portion is exposed to light. This electrostatic latent image is subjected to reversal development by the developing device 113 and visualized as a toner image. The toner image is transferred onto a sheet-like recording medium S like transfer paper or an OHP sheet by the transfer unit 114 and fixed on the sheet-like recording medium S by the fixing device 116.

The sheet-like recording medium S having the toner image fixed thereon is discharged to the outside of the image forming apparatus. The photosensitive member 111 after the transfer of the toner image is cleaned by the cleaning device 115, whereby a residual toner and paper powder are removed from the photosensitive member 111. It is also possible that plural toner images of different colors are formed using plural optical scanning devices and photosensitive members and the toner images are superimposed to form a color image.

According to the invention, all the lenses constituting the coupling lens system are made of resin, and a diffractive optical surface is provided on at least one surface of each of the lenses. This makes it possible to manufacture the coupling optical system at low cost, easily machine the coupling optical system into a shape that is less likely to cause toppling, and compensate for deviation of a focus position. Therefore, it is possible to provide an optical scanning device that is low cost and can cope with a reduction in a diameter of a light spot.

According to the invention, all the lenses constituting the first optical system are made of resin, and a diffractive optical surface is provided on at least one surface of each of the lenses. This makes it possible to manufacture the first optical system at low cost, easily machine the first optical system into a shape that is less likely to cause toppling, and compensate for deviation of a focus position. Therefore, it is possible to provide an optical scanning device that is low cost and can cope with a reduction in a diameter of a light spot.

According to the invention, all the lenses constituting the coupling optical system and the first optical system are made of resin, and the diffractive optical surface is provided on at least one surface of each of the lenses. This make it possible to manufacture the coupling optical system and the first optical system at low cost, easily machine the coupling optical system and the first optical system into a shape that is less likely to cause topping, and compensate for deviation in a focus position. Therefore, it is possible to provide an optical scanning system, which can cope with a reduction in a diameter of an optical spot, at lower cost.

According to the invention, the diffractive optical system is provided on at least one surface of each of the lenses constituting the coupling optical system and the first optical system, and this diffractive optical surface is constituted as a concentric lattice or a linear lattice by forming unevenness on the surface of the lens. This makes it possible to easily machine the coupling optical system and the first optical system and compensate for deviation in a focus position. Thus, it is possible to provide an optical scanning device, which can cope with a reduction in a diameter of a light spot, at lower cost.

According to the invention, since a macroscopic shape of the diffractive optical surface is a coaxial spherical surface having a predetermined curvature radius, highly accurate machining is possible. Therefore, it is possible to provide an optical scanning device, performance of which can be easily improved.

According to the invention, since at least one lens constituting the scanning optical system is made of resin, it is possible to provide an optical scanning system that is low cost and can cope with a reduction in a diameter of a light spot and can be manufactured.

According to the invention, composite power of the lenses constituting the scanning optical system is positive power both in the main scanning direction and the sub-scanning direction. This makes it possible to compensate for focal shift due to temperature change. Therefore, it is possible to provide an optical scanning device that can cope with a reduction in a diameter of a light spot.

According to the invention, since composite power of the lenses constituting the coupling optical system and the first optical system is different in the main scanning direction and the sub-scanning direction, focal shift due to temperature change is controlled both in the main scanning direction and the sub-scanning. Therefore, it is possible to provide an optical scanning device that can cope with a reduction in a diameter of a light spot.

According to the invention, since a surface with largest diffractive power among the diffractive optical surfaces of the lenses constituting the coupling optical system and the first optical system has positive diffractive power, focal shift due to temperature change is controlled. Therefore, it is possible to provide an optical scanning device that can cope with a reduction in a diameter of a light spot.

According to the invention, since the coupling optical system and the first optical system include one lens, respectively, and light beams emitted form the coupling optical system are diverging rays. This makes it possible to reduce machining time for the coupling optical system and the first optical system. Therefore, it is possible to provide an optical scanning device that is low cost.

According to the invention, at least one of the lenses constituting the scanning optical system is made of resin, and the diffractive optical surface, which is a linear lattice, and the diffractive optical surface, which is a circular lattice, are provided in the coupling optical system or the first optical system. This makes it possible to manufacture the scanning optical system at low cost, easily machine the scanning optical system into a shape that is less likely to cause toppling, and compensate for deviation in a focus position. Therefore, it is possible to provide an optical scanning device that is low cost and can cope with a reduction in a diameter of a light spot.

According to the invention, in the coupling optical system and the first optical system, the diffractive optical surface, which is a circular lattice, is provided in the lens having a rotationally symmetrical refractive surface and the diffractive optical surface, which is a linear lattice, is provided in the lens having an anamorphic refractive surface. Therefore, it is possible to prevent angles of respective symmetrical surfaces from deviating from each other to deteriorate a wavefront.

According to the invention, the diffractive optical surface, which is a circular lattice, is provided in the coupling optical system and the diffractive optical surface, which is a linear lattice, is provided in the first optical system. Therefore, it is possible to prevent angles of respective symmetrical surfaces from deviating from each other to deteriorate a wavefront.

According to the invention, the diffractive optical surface is made uneven on the surface. Therefore, it is possible to obtain a diffractive effect.

According to the invention, the lens having the diffractive optical surface is made of resin. Therefore, it is possible to machine the lens easily and reduce cost.

According to the invention, since the diffractive optical surfaces of the respective optical system are set to compensate for fluctuation in a focus position due to temperature of the coupling optical system, the first optical system, and the scanning optical system, focal shift due to temperature change is controlled. Therefore, it is possible to provide a laser scanning apparatus that can cope with a reduction in a diameter of a light spot.

According to the invention, since any one of the optical scanning devices described above is provided in a laser writing unit, focal shift due to temperature change is controlled. Therefore, it is possible to realize an image forming apparatus that can cope with a reduction in a size of a light spot.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanning device comprising:
    a light source including a semiconductor laser that generates a light beam;
    a coupling optical system that couples the light beam from the light source and changes the light beam to a diverging light beam, wherein the coupling optical system includes at least one lens;
    a first optical system that changes the diverging light beam from the coupling optical system to a parallel beam in a main scanning direction and to a focused light beam, which is focused on a deflector, in a sub-scanning direction;
    the deflector that deflects the light beam from the first optical system to the main scanning direction; and
    a scanning optical system that condenses the light beam deflected by the deflector, wherein
    the at least one lens in the coupling optical system is made of resin, and
    the at least one lens in the coupling optical system has a diffractive optical surface at least on one surface thereof, and the diffractive optical surface has a plurality of protruding rings having tips disposed on a spherical, concave surface facing the light source, and a phase function $\phi(h)$ of the diffractive optical surface is given by $$\phi(h) = C_1 \cdot h^2 + C_2 \cdot h^4 + C_3 \cdot h^6 + C_4 \cdot h^8 + C_5 \cdot h^{10},$$

where $\phi(h)$ is an even power series, $C_1$ to $C_5$ are constants, and h is a distance from an optical axis.

2. The optical scanning device according to claim 1, wherein the scanning optical system includes a plurality of lenses and at least one of the lenses of the scanning optical system is made of resin.

3. The optical scanning device according to claim 2, wherein a composite power of the lenses constituting the scanning optical system is positive both in the main scanning direction and the sub-scanning direction.

4. The optical scanning device according to claim 1, wherein a composite power of diffractive optical surfaces of the at least one lens constituting the coupling optical system and at least one lens constituting the first optical system is different in the main scanning direction and the sub-scanning direction.

5. The optical scanning device according to claim 1, wherein a surface with a largest diffractive power among the diffractive optical surfaces of the at least one lens constituting the coupling optical system and at least one lens constituting the first optical system has a positive diffractive power.

6. The optical scanning device according to claim 1, wherein
each of the coupling optical system and the first optical system includes a plurality of lenses.

7. The optical scanning device according to claim 1, wherein the diffractive optical surface of the at least one lens in the coupling optical system is set to compensate for a fluctuation in a focus position due to a change in temperature of the coupling optical system, the first optical system, and the scanning optical system.

8. An optical scanning device comprising:
a light source including a semiconductor laser that generates a light beam;
a coupling optical system that couples the light beam from the light source and changes the light beam to a diverging light beam, wherein the coupling optical system includes at least one first lens;
a first optical system that changes the diverging light beam from the coupling optical system to a parallel beam in a main scanning direction and to a focused light beam, which is focused on a deflector, in a sub-scanning direction, wherein the first optical system includes at least one second lens;
the deflector that deflects the light beam from the first optical system to the main scanning direction; and
a scanning optical system that condenses the light beam deflected by the deflector, wherein
the at least one first lens and the at least one second lens are made of resin, and
each of the at least one first lens and the at least one second lens has a diffractive optical surface on at least one surface thereof, the diffractive optical surface of the at least one first lens has a plurality of protruding rings having tips disposed on a spherical, concave surface facing the light source, and the diffractive optical surface of the at least one second lens has a plurality of protruding linear rows having tips disposed on a planar surface, and a phase function $\phi(h)$ of the diffractive optical surface of the at least one first lens is given by $$\phi(h)=C_1 \cdot h^2+C_2 \cdot h^4+C_3 \cdot h^6+C_4 h^8+C_5 \cdot h^{10},$$

where $\phi(h)$ is an even power series, $C_1$ to $C_5$ are constants, and h is a distance from an optical axis.

9. The optical scanning device according to claim 8, wherein the scanning optical system includes a plurality of lenses and at least one of the lenses of the scanning optical system is made of resin.

10. The optical scanning device according to claim 9, wherein a composite power of the lenses constituting the scanning optical system is positive both in the main scanning direction and the sub-scanning direction.

11. The optical scanning device according to claim 8, wherein a composite power of the diffractive optical surfaces of the lenses constituting the coupling optical system and the first optical system is different in the main scanning direction and the sub-scanning direction.

12. The optical scanning device according to claim 8, wherein a surface with a largest diffractive power among the diffractive optical surfaces of the lenses constituting the coupling optical system and the first optical system has a positive diffractive power.

13. The optical scanning device according to claim 8, wherein
the at least one first lens of the coupling optical system and the at least one second lens of the first optical system are each constituted by a plurality of lenses.

14. The optical scanning device according to claim 8, wherein each of the diffractive optical surfaces of the at least one first lens and the at least one second lens is set to compensate for a fluctuation in a focus position due to a change in temperature of the coupling optical system, the first optical system, and the scanning optical system.

15. An optical scanning device comprising:
a light source including a semiconductor laser that generates a light beam;
a coupling optical system that couples the light beam from the light source and changes the light beam to a diverging light beam, wherein the coupling optical system includes at least one first lens;
a first optical system that changes the diverging light beam from the coupling optical system to a parallel beam in a main scanning direction and to a focused light beam, which is focused on a deflector, in a sub-scanning direction, wherein the first optical system includes at least one second lens;
the deflector that deflects the light beam from the first optical system to the main scanning direction; and
a scanning optical system that condenses the light beam deflected by the deflector, wherein
a diffractive optical surface is provided at least on one surface of each of the at least one first lens and the at least one second lens, and
the diffractive optical surface of the at least one first lens is constituted as a plurality of protruding rings having tips disposed on a spherical, concave surface facing the light source, and the diffractive optical surface of the at least one second lens is constituted as a plurality of protruding linear rows having tips disposed on a planar surface, and a phase function $\phi(h)$ of the diffractive optical surface constituted by the plurality of protruding rings is given by $$\phi(h)=C_1 \cdot h^2+C_2 \cdot h^4+C_3 \cdot h^6+C_4 \cdot h^8+C_5 \cdot h^{10},$$

where $\phi(h)$ is an even power series, $C_1$ to $C_5$ are constants, and h is a distance from an optical axis.

16. The optical scanning device according to claim 15, wherein a macroscopic shape of the diffractive optical surface is a coaxial spherical surface having a predetermined curvature radius.

17. The optical scanning device according to claim 15, wherein the scanning optical system includes a plurality of lenses and at least one of the lenses of the scanning optical system is made of resin.

18. The optical scanning device according to claim 17, wherein a composite power of the lenses constituting the scanning optical system is positive both in the main scanning direction and the sub-scanning direction.

19. The optical scanning device according to claim 15, wherein a composite power of the diffractive optical surfaces of the lenses constituting the coupling optical system and the first optical system is different in the main scanning direction and the sub-scanning direction.

20. The optical scanning device according to claim 15, wherein a surface with a largest diffractive power among the diffractive optical surfaces of the lenses constituting the coupling optical system and the first optical system has a positive diffractive power.

21. The optical scanning device according to claim 15, wherein
the at least one first lens of the coupling optical system and the at least one second lens of the first optical system are each constituted by a plurality of lenses.

22. The optical scanning device according to claim 15, wherein each of the diffractive optical surfaces of the at least one first lens and the at least one second lens is set to compensate for a fluctuation in a focus position due to a change in temperature of the coupling optical system, the first optical system, and the scanning optical system.

23. An optical scanning device comprising:
a light source including a semiconductor laser that generates a light beam;
a coupling optical system that couples the light beam from the light source and changes the light beam to a diverging light beam, wherein the coupling optical system includes at least one first lens;
a first optical system that changes the diverging light beam from the coupling optical system to a parallel beam in a main scanning direction and to a focused light beam, which is focused on a deflector, in a sub-scanning direction, wherein the first optical system includes at least one second lens;
the deflector that deflects the light beam from the first optical system to the main scanning direction; and
a scanning optical system that condenses the light beam deflected by the deflector, wherein
the scanning optical system includes a plurality of lenses and at least one of the lenses of the scanning optical system is made of resin, and
a first diffractive optical surface, which has a plurality of protruding rings having tips disposed on a spherical, concave surface facing the light source, and a second diffractive optical surface, which has a plurality of protruding linear rows having tips disposed on a planar surface, are provided in the at least one first lens and the at least one second lens, and a phase function $\phi(h)$ of the first diffractive optical surface is given by $$\phi(h) = C_1 \cdot h^2 + C_2 \cdot h^4 + C_3 \cdot h^6 + C_4 \cdot h^8 + C_5 \cdot h^{10},$$

where $\phi(h)$ is an even power series, $C_1$ to $C_5$ are constants, and h is a distance from an optical axis.

24. The optical scanning system according to claim 23, wherein
the first diffractive optical surface is provided in a lens having a rotationally symmetrical refractive surface and the second diffractive optical surface is provided in a lens having an anamorphic refractive surface.

25. The optical scanning device according to claim 23, wherein
the first diffractive optical surface is provided in the at least one first lens and the second diffractive optical surface is provided in the at least one second lens.

26. The optical scanning device according to claim 23, wherein a diffractive effect is obtained by an unevenness on each of the first and second diffractive optical surfaces.

27. The optical scanning device according to claim 26, wherein each of the first and second lenses is made of resin.

28. The optical scanning device according to claim 23, wherein the first diffractive optical surface and the second diffractive optical surface are each set to compensate for a fluctuation in a focus position due to a change in temperature of the coupling optical system, the first optical system, and the scanning optical system.

29. An image forming apparatus comprising an optical scanning device that includes,
a light source including a semiconductor laser that generates a light beam;
a coupling optical system that couples the light beam from the light source and changes the light beam to a diverging light beam, wherein the coupling optical system includes at least one lens;
a first optical system that changes the diverging light beam from the coupling optical system to a parallel beam in a main scanning direction and to a focused light beam, which is focused on a deflector, in a sub-scanning direction;
the deflector that deflects the light beam from the first optical system to the main scanning direction; and
a scanning optical system that condenses the light beam deflected by the deflector, wherein
the at least one lens in the coupling optical system is made of resin, and
the at least one lens in the coupling optical system has a diffractive optical surface at least on one surface thereof, and the diffractive optical surface has a plurality of protruding rings having tips disposed on a spherical, concave surface facing the light source, and a phase function $\phi(h)$ of the diffractive optical surface is given by $$\phi(h) = C_1 \cdot h^2 + C_2 \cdot h^4 + C_3 \cdot h^6 + C_4 \cdot h^8 + C_5 \cdot h^{10},$$

where $\phi(h)$ is an even power series, $C_1$ to $C_5$ are constants, and h is a distance from an optical axis.

30. An image forming apparatus comprising an optical scanning device that includes,
a light source including a semiconductor laser that generates a light beam;
a coupling optical system that couples the light beam from the light source and changes the light beam to a diverging light beam, wherein the coupling optical system includes at least one first lens;
a first optical system that changes the diverging light beam from the coupling optical system to a parallel beam in a main scanning direction and to a focused light beam, which is focused on a deflector, in a sub-scanning direction, wherein the first optical system includes at least one second lens;
the deflector that deflects the light beam from the first optical system to the main scanning direction; and
a scanning optical system that condenses the light beam deflected by the deflector, wherein
the at least one first lens and the at least one second lens are made of resin, and
each of the at least one first lens and the at least one second lens has a diffractive optical surface on at least one surface thereof, the diffractive optical surface of the at least one first lens and has a plurality of protruding rings having tips disposed on a spherical, concave surface facing the light source, and the diffractive optical surface of the at least one second lens has a plurality of protruding linear rows having tips disposed on a planar surface, and a phase function $\phi(h)$ of the diffractive optical surface of the at least one first lens is given by $$\phi(h) = C_1 \cdot h^2 + C_2 \cdot h^4 + C_3 \cdot h^6 + C_4 \cdot h^8 + C_5 \cdot h^{10},$$

where $\phi(h)$ is an even power series, $C_1$ to $C_5$ are constants, and h is a distance from an optical axis.

31. An image forming apparatus comprising an optical scanning device that includes,
- a light source including a semiconductor laser that generates a light beam;
- a coupling optical system that couples the light beam from the light source and changes the light beam to a diverging light beam, wherein the coupling optical system includes at least one first lens;
- a first optical system that changes the diverging light beam from the coupling optical system to a parallel beam in a main scanning direction and to a focused light beam, which is focused on a deflector, in a sub-scanning direction, wherein the first optical system includes at least one second lens;
- the deflector that deflects the light beam from the first optical system to the main scanning direction; and
- a scanning optical system that condenses the light beam deflected by the deflector, wherein
- a diffractive optical surface is provided at least on one surface of each of the at least one first lens and the at least one second lens, and
- the diffractive optical surface of the at least one first lens is constituted as a plurality of protruding rings having tips disposed on a spherical, concave surface facing the light source, and the diffractive optical surface of the at least one second lens is constituted as a plurality of protruding linear rows having tips disposed on a planar surface, and a phase function $\phi(h)$ of the diffractive optical surface constituted by the plurality of protruding rings is given by $$\phi(h)=C_1 \cdot h^2+C_2 \cdot h^4+C_3 \cdot h^6+C_4 \cdot h^8+C_5 \cdot h^{10},$$

where $\phi(h)$ is an even power series, $C_1$ to $C_5$ are constants, and h is a distance from an optical axis.

32. An image forming apparatus comprising an optical scanning device that includes,
- a light source including a semiconductor laser that generates a light beam;
- a coupling optical system that couples the light beam from the light source and changes the light beam to a diverging light beam, wherein the coupling optical system includes at least one first lens;
- a first optical system that changes the diverging light beam from the coupling optical system to a parallel beam in a main scanning direction and to a focused light beam, which is focused on a deflector, in a sub-scanning direction, wherein the first optical system includes at least one second lens;
- the deflector that deflects the light beam from the first optical system to the main scanning direction; and
- a scanning optical system that condenses the light beam deflected by the deflector, wherein
- the scanning optical system includes a plurality of lenses and at least one of the lenses of the scanning optical system is made of resin, and
- a first diffractive optical surface, which has a plurality of protruding rings having tips disposed on a spherical, concave surface facing the light source, and a second diffractive optical surface, which has a plurality of protruding linear rows having tips disposed on a planar surface are provided in the at least one first lens and the at least one second lens, and a phase function $\phi(h)$ of the first diffractive optical surface is given by $$\phi(h)=C_1 \cdot h^2+C_2 \cdot h^4+C_3 \cdot h^6+C_4 \cdot h^8+C_5 \cdot h^{10},$$

where $\phi(h)$ is an even power series, $C_1$ to $C_5$ are constants, and h is a distance from an optical axis.

* * * * *